United States Patent [19]

Gladish

[11] Patent Number: 4,838,169
[45] Date of Patent: Jun. 13, 1989

[54] MINIMUM FILLER RUNNER FOR AIR CONVEYOR SYSTEM

[75] Inventor: Herbert E. Gladish, Ottawa, Canada

[73] Assignee: E. B. Eddy Forest Products, Ltd., Ottawa, Canada

[21] Appl. No.: 210,387

[22] Filed: Jun. 23, 1988

[51] Int. Cl.$^4$ .............................................. B65G 51/03
[52] U.S. Cl. ................... 104/23.2; 104/290;
428/68; 428/71; 428/74; 428/76; 198/619;
406/88; 108/51.1; 267/151
[58] Field of Search ............... 104/23.2, 134, 290,
104/292; 180/164, 117–119; 280/610; 428/68,
71, 74, 76; 198/619, 811, 803.01, 803.02; 5/431,
434–442; 406/86, 88, 92, 77; 267/151; 108/51.1,
56.1, 56.3, 136

[56] References Cited

U.S. PATENT DOCUMENTS

| | | | |
|---|---|---|---|
| 3,611,944 | 10/1971 | Reder | 104/23.2 |
| 3,842,453 | 10/1974 | Redfield | 5/434 X |
| 3,861,674 | 1/1975 | Buck, Jr. | 428/76 X |
| 3,873,163 | 3/1975 | Gladish | 406/88 |
| 4,489,825 | 12/1984 | Gladish | 104/23.2 X |
| 4,550,823 | 11/1985 | Gladish | 198/811 X |
| 4,579,320 | 4/1986 | Gladish | 104/23.2 X |
| 4,616,960 | 10/1986 | Gladish | 406/88 |
| 4,687,079 | 8/1987 | Gladish | 5/434 X |

Primary Examiner—Johnny D. Cherry
Assistant Examiner—Joseph D. Pape
Attorney, Agent, or Firm—Jones, Tullar & Cooper

[57] ABSTRACT

An improved runner for use with a sailrail hydrostatic bearing levitation system is disclosed. The runner uses a substantially solid core having a degree of flexibility in a vertical plane, a thin pad of flexible, compliant material covering at least the transversely convex lower surface of the core, and an outer flexible, compliant cover enclosing the pad and the core. In another embodiment there is pad material on the upper surface of the core as well. The runner can be secured to a pallet and provides specific advantages over prior art runners which had a larger profile, were more expensive and were not as efficient as the low profile runner of this invention.

11 Claims, 3 Drawing Sheets

MINIMUM FILLER RUNNER FOR AIR CONVEYOR SYSTEM

The present invention relates in general to improved load supporting members, or runners, that might be utilized in hydrostatic bearing levitation systems; that is, in systems using fluid pressure to support and guide heavy loads as they move along a track system.

BACKGROUND OF THE INVENTION

While the principle of utilizing air pressure to support and guide a load as it moves along a track is not new, improvements have been realized in load-carrying efficiency through the implementaton of a system using rail sections having a concave support surface through which small diameter nozzles extend, the nozzle being angled with respect to both longitudinal and transverse planes. Air exiting the nozzles under pressure, provided in a plenum below the rail, creates a thin film between the rail surface and load support member positioned in the rail. The thin film of pressurized air creates a hydrostatic bearing on which the load support member can ride so that the member and the load supported thereby can move easily as it is guided along the rail. Usually a pair of rails will be positioned side by side to define a track system, there being a load supporting member located in each rail of the track system so as to support a pallet which spans the gauge distance between the rails and is adapted to carry the desired load.

Load carrying systems of the aforementioned type are sold commercially under the trade mark "SAILRAIL" by SailRail Enterprises, a division of E. B. Eddy Forest Products Ltd. Various patents relate to the system per se, the design of the rails, and the design of the runners, including Canadian Pat. Nos. 950,853 of July 9, 1974; 1,066,645 of Nov. 20, 1979, and 1,167,797 of May 22, 1984 and Canadian patent application Ser. No. 533,268 filed Mar. 30, 1987. The two major components of the SAILRAIL system are the rail, or track, and the load support member, or runner. The runner must meet several criteria in order to be effective. It must be compliant so as to aid in the proper distribution of the air film and thus work on rails that have profiles that are slightly variable or imperfect due to wear, dirt or extrusion tolerances; it must be abrasive resistant so that replacement is not required very often; it must be reasonably light since runners with pallets attached may be lifted by hand to or from the rails; it must be easily attached to or removed from a pallet; it must work efficiently in the rail system for which it is designed; and it must be economical to manufacture and maintain.

Heretofore runners for SAILRAIL systems have been manufactured in lengths of about four feet using a "log", being a roll of cellulosic paper product wound tightly on a collapsible cardboard core. The paper product was quite strong and had some stretch capability as a result of limited crepe. The product web resembled commercial serviette or napkin stock and is produced on the same production machinery that makes toilet and paper toweling rolls. For the SAILRAIL product, however, the wound circular log was first of all compressed while positioned on a curved plate of rail dimensions under a load of about 8000 pounds to create a round edged shape in transverse cross section in which the upper surface is flatter than the curved lower surface. The deformed log was then wrapped in a cover which was smooth, tough, compliant, abrasion resistant and moisture-proof. The cover could be, for example, a high density polyethylene or a relatively stiff sheet of polytetrafluoroethylene (TEFLON-trademark). The cover was closed over the log to secure the log, to provide the reactive bearing surface, and the resulting runner was ready for attachment to and subsequent use with a pallet. The lower curvature was very close to that of the rail surface; the upper surface was generally flat for attachment to the underside of the pallet; and the combination of the collapsed core, the squashed cellulosic material and the cover provided a runner that was compliant, capable of limited deformation under the application of a load and capable of at least partial recovery after load removal.

Runners manufactured as above are very effective and do exhibit vibration cushioning properties, but they are expensive to manufacture and because of their bulk are somewhat limited in their applicability to situations in which less exposure would be desirable. There is thus a need for a more versatile and less expensive runner to make the SAILRAIL system more attractive to potential users of the system.

SUMMARY OF THE INVENTION

The present invention meets the requirements mentioned above by providing a runner which uses a greatly reduced volume of cellulosic material therein without comprising the effectiveness or efficiency of the runner in a SAILRAIL system. Instead of forming the runner from a log, as in the past, the present invention replaces the cardboard core and wound web with a substantially solid core member, which has some vertical flexibility and is preformed to a desired shape, and a pad of flexible compliant material covering at least a transversely convex lower surface of the core member. A compliant outside sheet similar to that of the prior runner covers the core member and pad to secure the pad against the lower surface of the core member. Preferably the pad will cover the bottom surface of the core and will wrap around the longitudinal edges thereof to also cover the upper surface of the core.

In one embodiment the core member is formed from softwood and the pad is made up of a plurality of layers of cellulosic material. In other embodiments the core member could be extruded as hollow (or solid) lengths of plastic material, wood pulp material, rubber or metal (such as aluminum) and/or the pad could be made from a suitable compressible material such as wool or fiberglass. In yet other embodiments the core member could form the secondary of a linear induction motor or it could contain magnets for a linear motor with the primary being in the rail. The core member could be segmented longitudinally and/or transversely for added flexibility, and this would be especially desirable if the rail system, as for example in a warehouse, has horizontal and/or vertical curves. In any event, the runner of the present invention is at least the equal of the previous runner insofar as performance is concerned; it is more economical to produce; it has a significantly lower profile and is more easily protected and furthermore, by using a preformed core member it is possible to ensure that each runner produced is more closely identical to other runners produced in the same manner than was previously possible and this will means that the runner provides improved and more consistent profile footprints.

Broadly speaking, therefore the present invention may be considered to provide a load supporting means for positioning between a load and a concave load supporting surface, the means being capable of supporting the load and of substantially isolating the load from forces influencing the position of the surface, the means comprising an elongated substantially solid core member having a generally flat upper surface and a generally transversely convex lower surface, pad means of flexible, compliant material covering at least the lower surface, and an outer cover generally enclosing the pad means and the core, the pad means and the cover being formed of material which is capable of deformation under load and at least partial recovery when the load is removed.

DESCRIPTION OF THE PREFERRED EMBODIMENT

Figure 1:
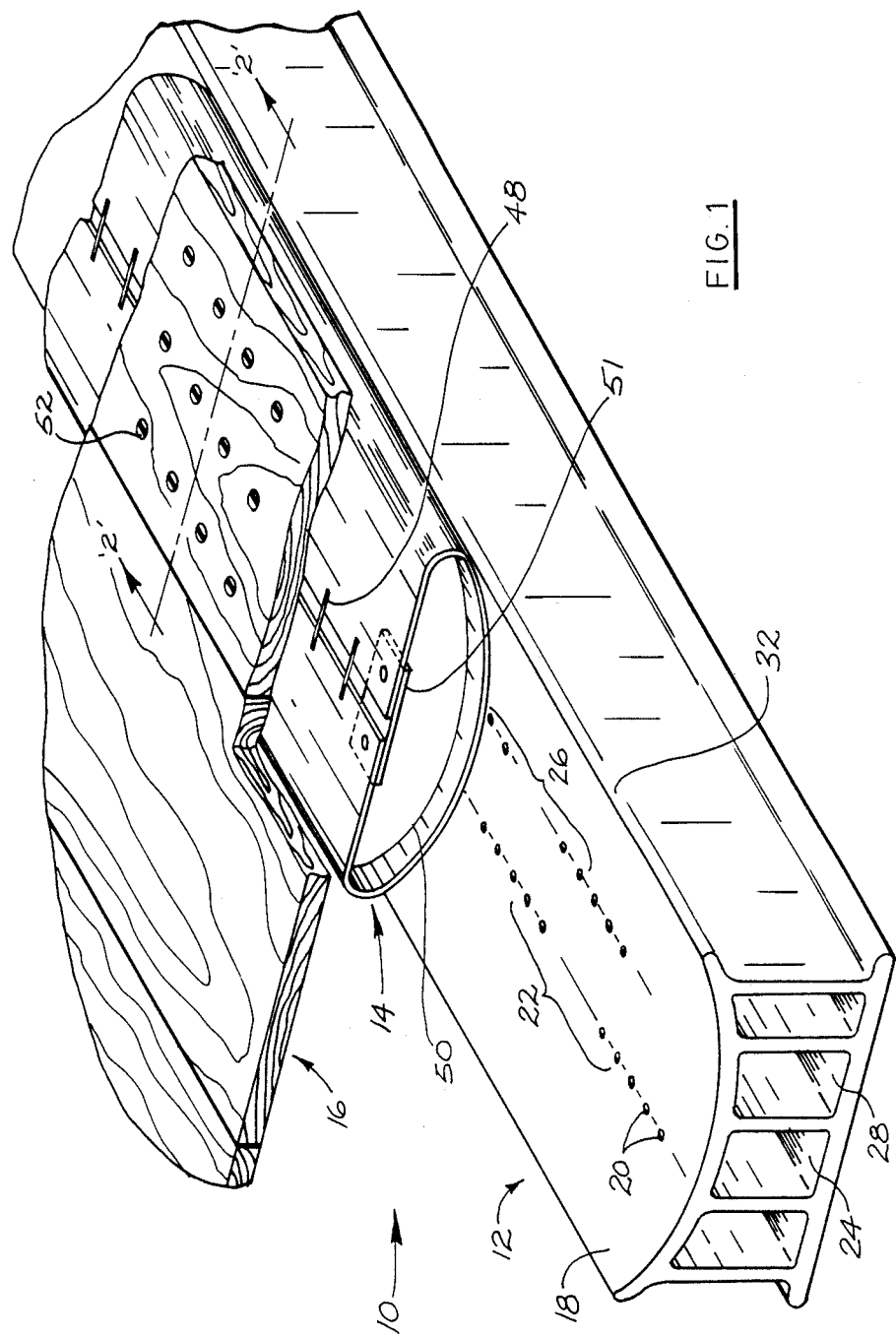
FIG. 1 shows, in perspective, a portion of a SAIL-RAIL system including a rail and a runner in accordance with the present invention.

FIG. 1 illustrates a typical SAILRAIL arrangement 10 comprising a rail 12, a runner 14 and a pallet 16. The rail 12 has a transversely shallowly concave upper surface 18 through which nozzles 20 extend. The nozzles are arranged in staggered aligned groups with one set 22 of groups communicating with an internal port, or plenum 24, and the other set 26 communicating with another internal port, or plenum 28. Each individual nozzle 20 is angled relative to the longitudinal axis of the rail and with respect to a tangent at the rail surface. Preferably the nozzles of set 22 are angled toward the edge 30 while the nozzles of set 26 are angled toward the edge 32. The design of the rail 12 is covered in Canadian Pat. No. 1,167,797 of May 22, 1984 and need not be discussed further herein.

The pallet 16 can be of any desired form as, for example, a sheet of plywood, plastic, steel, or fabricated from other suitable materials. The design of the pallet per se does not form a part of the present invention. It must, of course, be sufficiently strong to support the intended load without any significant deformation or vibration when loaded and moving.

Figure 2:
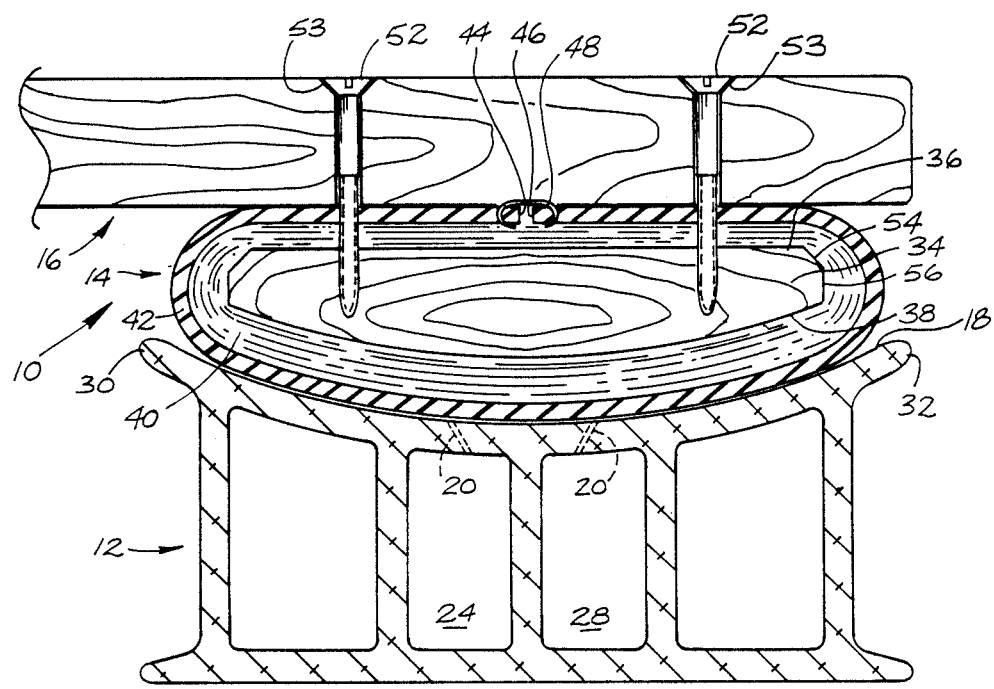
FIG. 2 shows a transverse cross-section along the line 2—2 of FIG. 1.
Figure 3:
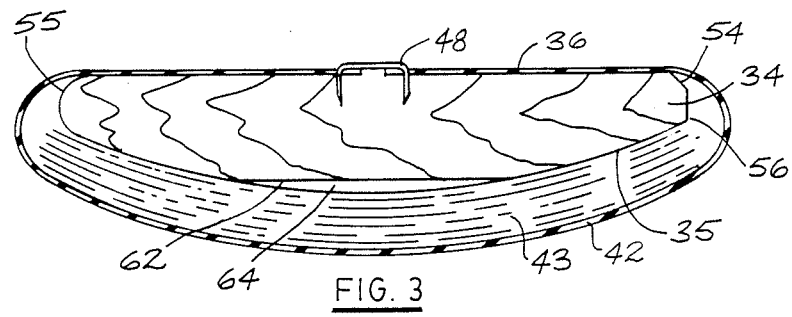
FIGS. 3 to 7 show schematic representations of additional embodiments of the present invention.
Figure 4:
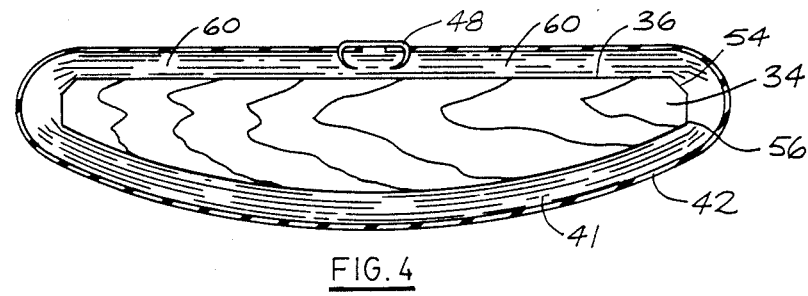

The runner 14 of this invention is shown in FIGS. 1 and 2 in position in the track or rail 12 and carrying the pallet 15. As best seen in FIG. 2 the runner 14 includes a substantially solid core member 34 which, in the illustrated embodiment, is shaped from wood so as to have a generally flat top surface 36 and a transversely convex lower surface 38, the latter having a slightly reduced degree of curvature so as to allow compatibility with the upper surface 18 of the rail 12. Preferably the core member 34 will exhibit a degree of vertical flexibility over its length, typically about four feet. Adjacent the lower surface 38 and wrapped around the remainder of the core member 34 is a pad 40 of flexible compliant material, the material covering the core to a thickness of about ½ inch in the manufactured runner. Preferably the pad 40 is made up of layers of cellulosic material such as might be cut from the outer plies of a large diameter roll of cellulosic material. In fact, the roll from which the pad 40 might be cut could be the same type of roll which might have been used in its entirety to make one of the prior art runners. It is possible that the core could be wrapped with a continuous web of cellulose, or in fact separate upper and lower pads, or even just a single lower pad, could be utilized as illustrated in FIGS. 3 and 4 discussed hereinbelow.

A cover 42 is wrapped securely about the pad 40 and the wooden core member 34 with the pad under compression. The cover 42 is made from relatively thick (0.044 inch) high density polyethylene, a material that is strong, smooth, abrasion and wear resistant and yet is appropriately flexible and compliant for the runner of this invention. Although an extruded sleeve-like cover could be used, it is easier to use a piece of sheet material and to wrap it about the pad and core member until the longitudinal edges 44, 46 thereof are almost touching on the top surface 36. With the cover 42 held in place, standard staples 48 can be driven through the adjacent edge portions of the cover 42 and pad 40 into the core member 34 along the length thereof so as to secure the cover to the runner and so as to hold the pad 40 securely in position.

At each end of the runner 14 an end piece 50 may be adhered to the free end edges of the cover, as shown in FIG. 1, providing a rail wiping function, or an end flap (not shown) may be made from excess cover material to be adhered or stapled to the rest of the cover, thereby closing off the ends of the runner.

The pallet 16 may be secured to the upper surface of the runner 10 by way of bolt and plate fasteners 51 or by way of wood screws 52 spaced apart along the length of the runner. Such screws should be loosely secured to the pallet, as by using oversize clearance holes 53 to allow for some limited vertical runner movement relative to the pallet. Thus the pallet can be easily removed from the runners if necessary.

As shown in FIG. 2 the core 34 may have bevelled and/or trimmed edges as at 54 or 56, providing room for the ends or the wrapping of the pad layers during initial assembly and during operation. Such trimmed edges also permit additional flexure of the cover material at the edges of the runner, improving the compliancy of the cover. As seen in FIG. 3, at the left side, the trimmed edges may be rounded, as at 55, instead of bevelled.

As illustrated, the core 34 is formed from a length of wood, preferably a softwood. Such material is easy to work with, and will have a degree of flexibility in the vertical plane. The wood core is appropriate for attachment thereto of the cover via staples 48 and the pallet via wood screws 52. As an alternative to wood the core 34 could be extruded from plastics or metals, could be hollow or solid or could be moulded in foam or other thermal or chemical setting materials. With such materials the pallet might have to be attached to the runner by end cover plates with bolts or with gang nail fasteners or by self-tapping or machine screws.

The pad 40 is preferably made from layers of cellulosic materials as described hereinabove but it could be formed from any suitable material which is compressible under load and which recovers substantially under load removal. Suitable alternative materials for the pad include foam rubber, foam plastic, wool or fiberglass, for example.

FIGS. 3 to 7 illustrate, somewhat schematically, alternative construction options which could be included in a basic runner as has been described hereinabove.

In FIG. 3 a single pad 43 is shown only on the bottom surface of the core 34. This embodiment is operable but does not have the benefits of the embodiments of FIGS.

1, 2 or 4. FIG. 3 also shows a feature wherein a portion 62 of the arcuate lower core surface 38 is planed flat so as to create a slight gap 64 between the portion 62 and the pad 43 therebelow. This gap or cavity 64 provides a space into which the pad 43 can expand to enhance the air film cavity by varying the footprint pressure of the cover as it vibrates, along with cover 42, under the influence of the jets exiting from the nozzles 20 in the rail 12. A certain degree of cover and pad vibration (or "dither") is desirable to help reduce the coefficient of friction between the cover and the rail surface at start-up and to also aid in propagation of the fluid film under the runner as the runner travels along the rail.

FIG. 4 is a view similar to FIG. 2 but showing separate pads 41 and 60 on the upper and lower surfaces 36, 38 respectively of the core 34. The material 60 could be of the same or different material as the pad 41. The pad 60 should extend the full width or surface 36 and possibly will extend around the trimmed edges 54, 56. By providing additional padding, albeit a thin layer of padding, load vibration control will be improved and a smoother, more uniform ride for the load will result. More importantly the limited flexibility of the core 34 will not be restrained.

The surface portion 62 need not be a flat surface. It could also take the form of a slight concavity formed upwardly into the lower surface 38 of the core. Furthermore, the cavity 64 need not be centered transversely of the runner 14. It could be offset toward one side of the runner or the other, depending on the orientation of the nozzles in the rail.

Figure 5:
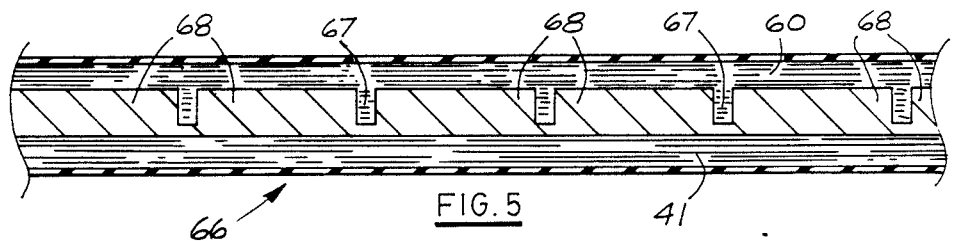

FIG. 5 shows a longitudinal section of a runner 66 having a cover 42, and pad material 41, 60 as with the embodiment of FIG. 4. However in this embodiment a plurality of indivdual, longitudinally spaced apart slits or cuts 67 are provided in the upper portion of the core member, defining core sections 68. By providing a series of core sections 68 the runner 66 will have a greater ability to flex in pitch and yaw than the runner 14 and this can be a benefit if the rail system in which the runner 66 is to operate has changes in elevation and/or direction therein. Indeed, individual separate core members could be longitudinally spaced apart with a single runner for even more flexibility. In order to further accommodate directional changes one might consider securing the pallet to only the central core members rather than to all core members. If the pallet were firmly secured to all core members 68 the ability of the runner 66 to flex would be substantially lost.

Figure 6:
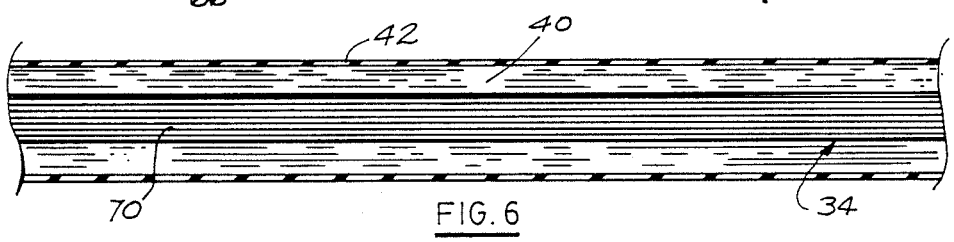
Figure 7:
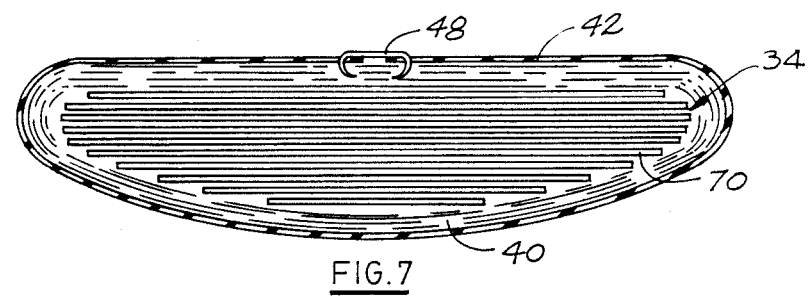

FIGS. 6 and 7 show situations in which the natural tendency of runners to travel along a rail under the influence of external forces such as gravity is enhanced by the use of a synchronous linear motor in which the core member(s) are, or include, high power permanent magnets or a secondary of a linear induction motor (FIGS. 6 and 7). In each case the primary of the motor is provided in the rail and the secondary in the runner. For a synchronous linear motor the secondary magnets could be visualized by looking at FIG. 5 and considering the core sections 68 to be the magnets, with gaps 67 representing spacers therebetween. The magnets would be provided in the core 34, spaced apart therealong, for driving interaction with the primary coils in the rail. For the linear induction motor of FIGS. 6 and 7 the core 34 itself may form the secondary for the motor if made from suitable material or else the appropriate secondary material may be included in the runner, positioned between the core and the pad, or between the pad and the cover, for interaction with the primary coils in the rail. In the situation of FIGS. 6 and 7 the secondary could take the form of a plurality of sheet metal strips 70 loosely laminated together to form the core 34 itself and separated from the cover 42 by the pad 40.

The present invention provides an improved runner for SAILRAIL systems, achieving the advantages enumerated hereinbefore. Preferred embodiments of the invention have been disclosed but it is expected that a skilled practitioner could effect changes therein without departing from the spirit of the invention. The scope of protection to be afforded this invention is to be determined from the claims appended hereto.

The embodiments of the invention in which an exclusive property or privilege is claimed are defined as follows:

1. A load supporting means for positioning between a load and a concave load supporting surface for supporting said load above said surface, said means comprising an elongated core member having a generally flat upper surface and a generally transversely convex lower surface, pad means of flexible, compliant material covering at least said lower surface, and an outer cover generally enclosing said pad means and said core, said pad means and said cover being formed of material which is capable of deformation under load and at least partial recovery when the load is removed.

2. A load supporting means in accordance with claim 1, wherein said core member has a limited degree of flexibility in a vertical plane and is formed from a substantially solid material selected from the group comprising: hardwoods, softwoods, plastics materials, foam, rubber, metal laminations and extruded aluminum.

3. A load supporting means in accordance with claim 1, wherein said core member has a limited degree of flexibility in a vertical plane and is formed as a hollow extrusion from a suitable plastic or metallic material.

4. A load supporting means in accordance with claim 1, wherein said pad means is formed from a material selected from the group comprising: closely packed layers of cellulosic sheet material, wool, fiberglass, and foam rubber.

5. A load supporting means in accordance with claim 1 including a central profiled surface portion in said lower surface defining a cavity between said surface portion and the adjacent upper surface of said pad means.

6. A load supporting means in accordance with claim 1, wherein said core member includes a plurality of transverse slits therein defining a plurality of short, longitudinally spaced apart core sections, said pad means and said cover extending for the entire length of said load supporting means.

7. A load supporting means in accordance with claim 1, wherein portions of said pad means extend around the sides of and cover the upper surface of said core member, said cover also enclosing said extended pad portions.

8. A load supporting means in accordance with claim 1, wherein said core member contains means defining the secondary of a synchronous linear motor.

9. A load supporting means in accordance with claim 1, wherein said core member forms the secondary of a synchronous linear motor.

10. A load supporting means in accordance with claim 9, wherein said core member includes a plurality of loosely vertically laminated strips of thin metallic material extending the length of said core.

11. A load supporting means in accordance with claim 1, wherein said pad means includes a lower pad adjacent said lower surface and an upper pad adjacent said upper surface.

* * * * *